A. E. BLOOMFIELD.
MAP.
APPLICATION FILED APR. 24, 1920.
1,364,239.
Patented Jan. 4, 1921.
2 SHEETS—SHEET 1.
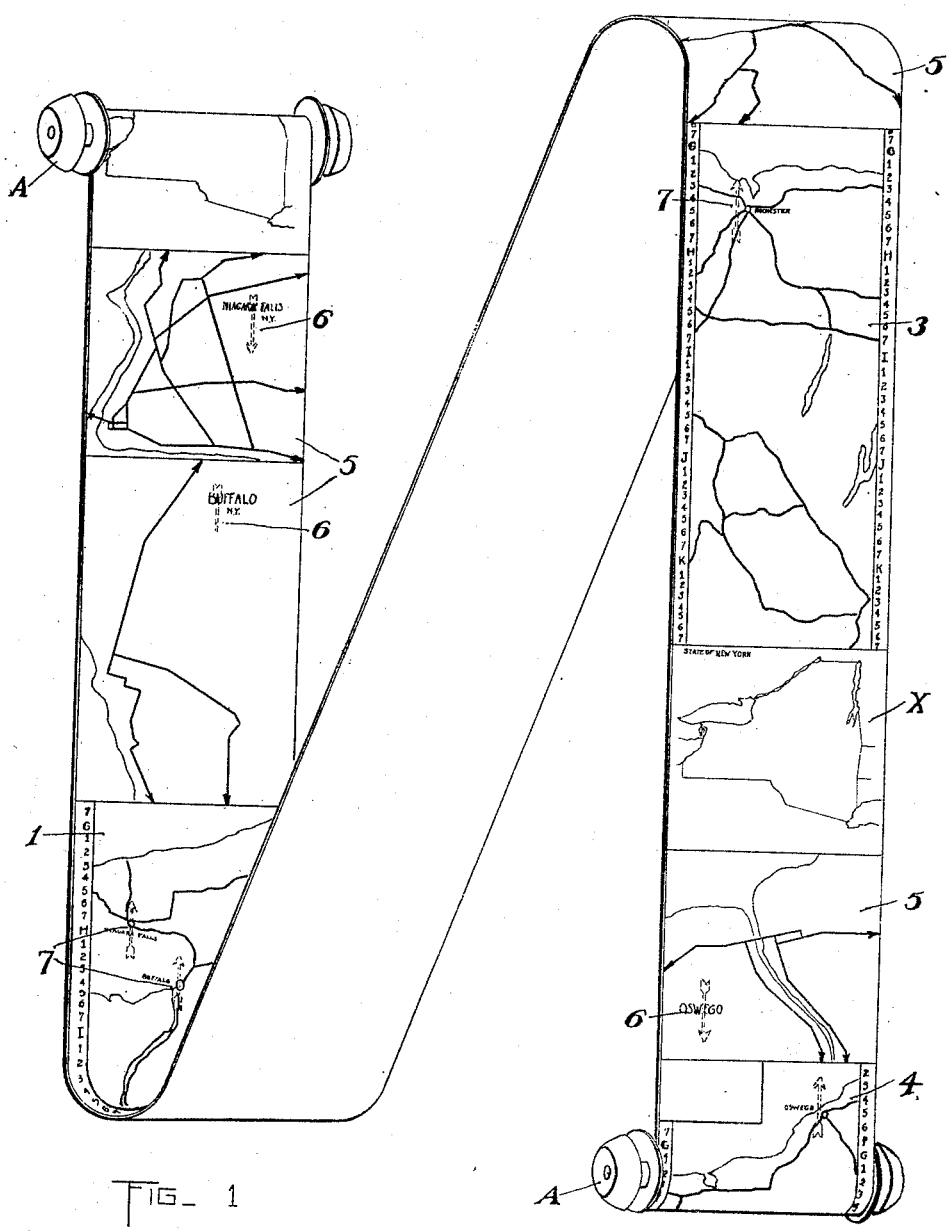

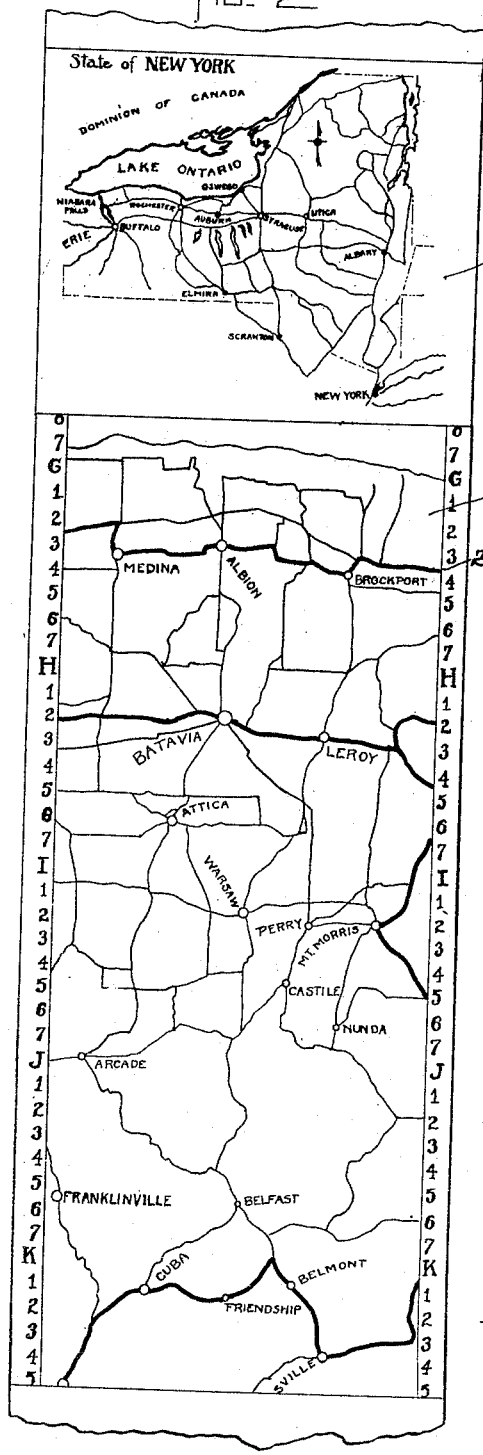
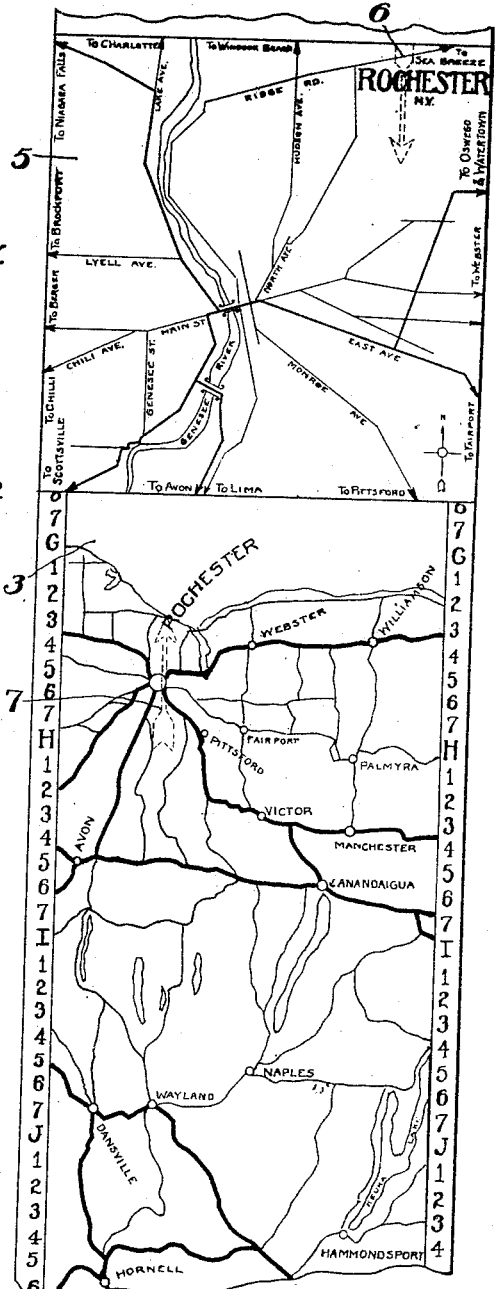

UNITED STATES PATENT OFFICE.

ARTHUR E. BLOOMFIELD, OF ROCHESTER, NEW YORK, ASSIGNOR TO WHITFIELD MAP COMPANY, INC., OF ROCHESTER, NEW YORK, A CORPORATION.

MAP.

1,364,239.  Specification of Letters Patent.  Patented Jan. 4, 1921.

Application filed April 24, 1920. Serial No. 376,291.

*To all whom it may concern:*

Be it known that I, ARTHUR E. BLOOMFIELD, a citizen of the United States, and resident of Rochester, in the county of Monroe and State of New York, have invented certain new and useful Improvements in Maps, of which the following is a specification.

The present invention relates to maps and an object thereof is to provide a map in such a form that it may be compactly arranged in a small space convenient for ready reference. Another object of the invention is to provide a map in such a form that any portion of a given geographical area may be readily presented at a certain point for inspection. Still another object of the invention is to provide a map arranged on a single strip with parallel sections of a given geographical area arranged in a single line thereon, means being provided for indicating a given position at the edge of one section on the edge of an adjacent section. A still further object of the invention is to provide in connection with the parallel sections, enlargements of portions of the different sections with indicating means on the sections and the enlargements for indicating the respective directions of the corresponding map portions.

To these and other ends the invention consists of certain parts and combinations of parts, all of which will be hereinafter described, the novel features being pointed out in the appended claims.

In the drawings:

Figure 1 is a perspective view of a map constructed in accordance with this invention; and Figs. 2 and 3 are enlarged fragmentary views of the map.

According to this invention a given geographical area is divided up into a number of parallel sections arranged in a single line on a single strip mounted preferably on rollers A which may be situated at any desired distance from each other. In the present instance, the State of New York is taken as an example and only four sections, indicated at 1, 2, 3 and 4 are illustrated and some of these only partially. In Fig. 1 only some of the important roads are shown. The strip may also have arranged thereon a complete map of the given area as well as enlargements 5 of certain portions of the sections, such as maps of the cities with their environs. When an enlargement or city map is provided, an arrow 6 or other suitable means may be provided on the city map or enlargement which will indicate the direction in which the strip is to be moved in order to present to view the section to which the enlargement refers. Furthermore, said section is provided with arrows 7 which will indicate the direction in which the strip is to be moved in order to find a map of any given city or enlargement.

For the purpose of indicating any road or point on the edge of one map section on the matching edge of an adjacent map section, indicating means may be provided comprising preferably letters arranged in spaced relation on each side of each section with a series of numbers between the letters, the characters being the same as the matching edges of two map sections. For example, assume that one is traveling from Medina to Rochester, the main road passing through Albion and Brockport will intersect one edge of the map section $2^a$ between the letters G and H and between the numerals 3 and 4. The map strip is turned until the next section is presented to view and this road will be found on the matching edge of section 2 between the letters G and H and the numerals 3 and 4. Should the enlargement of the city of Rochester be desired, when the environs of such city are reached, section 2 is shifted to present the enlargement of Rochester to view and this map preferably points out the main streets and has at the edges of the map, matter indicating the city or town with which such streets connect.

From the foregoing it will be seen that there has been provided a single strip having parallel sections of a map of given area arranged thereon. This strip is shiftable to present any portion of any one of the sections to view and the edges of the strip have indicating means whereby any point of a matching edge of an adjacent section may be readily found. Enlargements of portions of the sections are provided and means is provided whereby any enlargement or section may be quickly found.

What I claim as my invention and desire to secure by Letters Patent is:

1. A map in the form of a strip having parallel sections of a given geographical area arranged in a single line thereon, and means for indicating any position on an edge of one section on the matching edge of an adjacent section.

2. A map in the form of a strip having parallel sections of a given geographical area arranged in a single line thereon, and means for indicating any position on an edge of one section on the matching edge of an adjacent section, said means being in the form of similar characters on matching edges.

3. A map in the form of a strip having parallel sections of a given geographical area arranged in a single line thereon, means for indicating any position on an edge of one section on the matching edge of an adjacent section, enlargements of portions of the sections also arranged on the strip, and indicating means on the sections for indicating the positions of enlargements on the strip, and indicating means on the enlargements for indicating the direction of the section to which the enlargement refers.

ARTHUR E. BLOOMFIELD.